United States Patent
Jocham et al.

(10) Patent No.: US 8,448,512 B2
(45) Date of Patent: May 28, 2013

(54) SENSOR SYSTEM AND METHOD FOR PRODUCING A SENSOR SYSTEM

(75) Inventors: Reinhold Jocham, Hechingen (DE); Juergen Kurle, Reutlingen (DE); Franz Schmich, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 294 days.

(21) Appl. No.: 12/734,687

(22) PCT Filed: Nov. 11, 2008

(86) PCT No.: PCT/EP2008/065321
§ 371 (c)(1),
(2), (4) Date: Oct. 28, 2010

(87) PCT Pub. No.: WO2009/083322
PCT Pub. Date: Jul. 9, 2009

(65) Prior Publication Data
US 2011/0041602 A1    Feb. 24, 2011

(30) Foreign Application Priority Data

Dec. 27, 2007 (DE) .......................... 10 2007 062 700

(51) Int. Cl.
*G01P 1/02* (2006.01)
(52) U.S. Cl.
USPC .......................................... 73/493; 73/866.5

(58) Field of Classification Search
USPC .................... 73/493, 504.02, 504.12, 514.01, 73/514.14, 866.5
See application file for complete search history.

(56) References Cited

U.S. PATENT DOCUMENTS

| | | | |
|---|---|---|---|
| 5,233,871 A * | 8/1993 | Schwarz et al. | 73/493 |
| 7,196,404 B2 * | 3/2007 | Schirmer et al. | 73/504.12 |
| 2008/0041158 A1 * | 2/2008 | Yamamoto | 73/514.36 |
| 2008/0264169 A1 | 10/2008 | Ingrisch et al. | |

FOREIGN PATENT DOCUMENTS

| | | |
|---|---|---|
| DE | 103 52 002 | 6/2005 |
| DE | 10 2006 002 350 | 7/2007 |
| JP | 1-301175 | 12/1989 |
| JP | 2002-503324 | 1/2002 |
| WO | WO 2005/057998 | 6/2005 |

\* cited by examiner

*Primary Examiner* — John Chapman, Jr.
(74) *Attorney, Agent, or Firm* — Kenyon & Kenyon LLP

(57) ABSTRACT

A sensor system is provided having a base plate, a sensor module, a damping element and a support frame, the base plate having a main plane of extension and a recess that is perpendicular to the main plane of extension; the support frame being fastened in the recess; the damping element being situated between the support frame and the recess; and the sensor module further being pressed into the support frame in a form-locking and a force-locking manner.

22 Claims, 2 Drawing Sheets

SENSOR SYSTEM AND METHOD FOR PRODUCING A SENSOR SYSTEM

BACKGROUND OF THE INVENTION

1. Field of the Invention

The present invention relates to a sensor system.

2. Description of Related Art

Sensor systems of this kind are generally known. An inertial sensor system is known from published German patent document DE 10 2006 002 350 A1, having a sensor module, mounted on a support, which includes a micromechanically produced inertial sensor and an evaluation circuit, the sensor module being connected to the support by an elastic coupling element.

SUMMARY OF THE INVENTION

In contrast to the related art, the sensor system according to the present invention and the method, according to the present invention, of producing a sensor system have the advantage that the sensor module is fixed via a considerably more loadable and more long-lived mechanical connection on the support frame and thus also on the base plate, and at the same time, the production process is clearly reduced in cost. Furthermore, the sensor system, according to the present invention, has considerably less overall depth compared to the related art, so that a clearly simpler, many-faceted and more cost-effective implementation of the sensor system is made possible, especially with respect to the application of the sensor system in the automotive field. With respect to an action of force in the plane of main extension, the sensor module is fixed by form locking, and with respect to an action of force perpendicular to the plane of main extension, the sensor module is fixed by force locking, so that the sensor module is securely fastened mechanically even with respect to comparatively large actions of force to the base and the support frame. The achievement of sufficient mechanical stability in the recess or rather the support frame, based on a continuous material connection is not possible, particularly when using sensor modules which include standard metallic housings. Moreover, a continuous material connection requires an additional production step in the production of a sensor system, so that mechanical fixing of the sensor module, based only on form locking and force locking, brings about considerable cost advantages in the production of the sensor system. Especially for the production of the continuous material connection, a comparatively time-intensive hardening of the adhesive, or the like, becomes necessary, thus causing further costs. A short production time is required, particularly in the case of coated sensor modules, which may have a nickel layer, for example, based on oxidation of the layer that progresses with time. Furthermore, the pressing operation prevents a temperature increase of the sensor system accelerating the hardening time, which temperature increase has a particularly disadvantageous effect on the sensor module and the sensor. The sensor system according to the present invention also combines the advantages named, of a force-locking fixing of the sensor module with the advantages of a vibration-decoupled fastening of the sensor module to the base plate, since spurious vibrations of the base plate are greatly damped by the damping element, and therefore the influence of the spurious vibrations on the sensor module is minimized. For the maximum decoupling of the sensor module from the base plate, a development of the damping element, of the support frame and/or of the recess is provided, such that a resonant frequency of the sensor module together with the support frame lies far removed from a critical frequency, the critical frequency being determined particularly by a vibrational and/or resonant frequency of a rotation rate sensor's Coriolis mass. Particularly advantageously, it is provided that the support frame be clamped in with force locking in the recess together with the sensor module by the damping element, which especially includes an elastic element, with respect to a motion perpendicular to the main direction of extension, and with form locking with respect to a motion in the main direction of extension.

According to one preferred refinement it is provided that the sensor module have at least one terminal pin, which has a connection surface outside the sensor module that is essentially parallel to the plane of main extension. Based on this developed connection surface of the terminal pin, a bonding process directly onto the connection surface is advantageously made possible, so that the sensor module is able to be contacted in an electrically conductive manner in a particularly simple manner. Such a bonding process is favored by the comparatively slight overall depth of the sensor system, since between the base plate and the sensor module a slight difference in height is thus developed perpendicular to the plane of main extension. In particular, electrical, electronic and/or micromechanical components and preferably a rotation rate sensor inside the sensor module are contacted electrically conductively via the terminal pin.

According to another preferred refinement, it is provided that the terminal pin includes a standard pin, the head of the standard pin being situated outside the sensor module, so that the implementation of the terminal pin is particularly cost-effective because a standard component is used. The head of the standard pin also includes a connection surface, so that bonding is performed directly onto the head of the standard pin for the electrical contacting.

According to still another preferred refinement it is provided that the connection surface is contacted in an electrically conductive manner using a bonding wire, the terminal pin preferably having an additional connection surface which is electrically conductively contacted using a further bonding wire, the additional connection surface being particularly preferably situated within the sensor module. Particularly advantageously, because of the additional bonding wire on the inside of the sensor module, electrical, electronic and/or micromechanical components on the inside of the sensor module are connected electrically conductively to the additional connection surface on the inside of the sensor module, so that, also because of the bonding wire connected to the connection surface, the electrical, electronic and/or micromechanical components are connected electrically conductively. The bonding wire preferably includes a thick wire and the additional bonding wire includes a thin wire and/or the connection surface is larger than the additional connection surface.

According to yet another preferred development it is provided that the damping element includes a silicone, the silicone being preferably sprayed between the support frame and the base plate. In an advantageous manner the silicone functions both as damping element and for the continuous material connection and/or the force-locking fastening of the support frame in the recess, since the silicone preferably generates a continuous material adhesive connection between the support frame and the base plate or the recess and/or since, during the fastening of the support frame in the recess, the silicone is preferably reversibly deformed, so that the resulting tensional force of the silicone generates a force-locking connection between the base plate and the support frame with respect to a motion that is perpendicular to the main plane of extension.

According to a further preferred refinement it is provided that the elastic properties of the damping element be essentially constant from 125° C. to −30° C., preferably to −50° C., and especially preferably to −40° C. Consequently, good damping properties of the damping element are achieved particularly advantageously over a comparatively great temperature range, and especially also at comparatively low temperatures. In particular, damping elements made of silicone have considerable advantages in temperature stability over damping elements made of rubber, that are used in the related art, since silicone has better damping properties compared to rubber, at clearly lower temperatures.

Another preferred refinement provides that the extension of the base plate perpendicular to the plane of main extension and/or the extension of the support frame perpendicular to the plane of main extension overlap the extension of the sensor module in a direction parallel to the plane of main extension at least by 40%, preferably at least by 70% and especially preferably by at least 90%. The force locking and/or the continuous material connection between the support frame and the base plate are thus preferably clearly increased, since a greater overlapping surface leads to a greater frictional force and/or to a greater adhesive force between the support frame and the base plate. Moreover, the height of the installation space perpendicular to the plane of main extension is clearly reduced.

Still another preferred refinement provides that the sensor system have a total extension of at most 10 mm, preferably at most 6 mm and especially preferably at most 5.5 mm perpendicular to the plane of main extension. Such a reduction in the height of the installation space required, perpendicular to the plane of main extension makes possible in an especially advantageous manner a simpler, more multifaceted and more cost-effective implementation of the sensor system, especially in a vehicle.

According to another preferred refinement it is provided that the sensor module include a hermetically sealed welded metal housing, the support frame preferably including an aluminum frame. This then advantageously makes possible the vibration-damped fastening of sensor modules in standard housings which, in particular, demonstrate comparatively great sealing.

One preferred further embodiment provides that the sensor module include a rotation rate sensor.

One more subject matter of the present invention is a method for producing a sensor system, in a first method step the support frame being inserted into the recess; in a second method step the damping element being sprayed between the recess and the support frame; and in a third method step the sensor module being pressed into the support frame. A sensor system is produced especially advantageously in comparison to the related art, using a low number of production steps, so that the production is clearly more cost-effective, in particular, saving completely a method step for the continuous material connection of the support frame to the sensor module, and therefore no hardening time, no temperature increase for the hardening and/or no adjustment times are required. Furthermore, the force-locking connection between the sensor module and the support frame achieves a connection that is mechanically considerably more firm, so that the sensor system is clearly more stable than the ones of the related art.

Still another preferred refinement provides that, in a fourth method step, the connection surface of the at least one terminal pin is contacted electrically using a bonding wire, especially to a component situated on the base plate, in particular, in a fifth method step, carried out before the first method step, an additional connection surface lying opposite the connection surface of the terminal pin, along the terminal pin, being electrically contacted using an additional bonding wire, and thus particularly preferably being connected to an electrical, electronic and/or micromechanical component on the inside of the sensor module in an electrically conductive manner. In an especially advantageous manner, the use of a terminal pin having a connection surface makes possible a comparatively simple and cost-effective electrical contacting of the electrical, electronic and/or microelectronic components on the inside of the sensor module, using two bonding processes, the connection surface being formed in particular by the head of a standard pin.

Exemplary embodiments of the present invention are illustrated in the drawings and explained in detail in the following description.

DETAILED DESCRIPTION OF THE INVENTION

Figure 1:
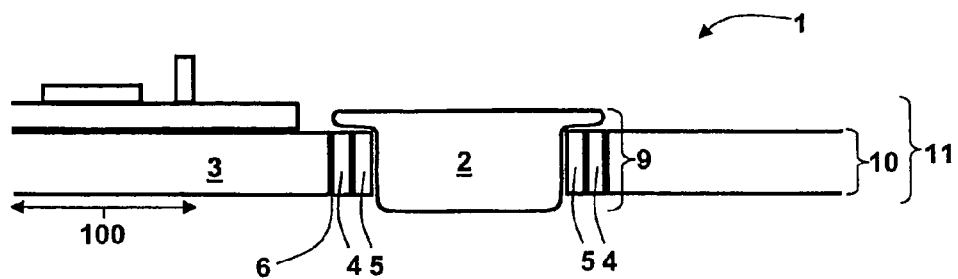
FIG. 1 shows a schematic side view of a sensor system according to a first specific embodiment of the present invention.

In the various figures identical components have always been provided with the same reference numerals and thus are usually also labeled only once.

FIG. 1 shows a schematic side view of a sensor system 1 in accordance with a first specific embodiment of the present invention, sensor system 1 having a base plate 3, a sensor module 2, a damping element 4 and a support frame 5; base plate 3 having a main plane of extension 100 and a recess 6 that is perpendicular to main plane of extension 100; support frame 5 being fastened in recess 6; and damping element 4 being situated between support frame 5 and recess 6; and sensor module 2 further being pressed into support frame 5 in a form-locking and a force-locking manner. The damping element 4 may include a silicone, the silicone being preferably sprayed between the support frame 5 and the base plate 3. The elastic properties of the damping element may be essentially constant from 125° C. to −30° C., preferably to −50° C., and especially preferably to −40° C. Extension 10 of base plate 3 at right angles to main plane of extension 100 overlaps the major part of extension 9 of sensor module 2 at right angles to main plane of extension 100 in a direction parallel to main plane of extension 100, so that sensor system 1, at right angles to main plane of extension 100 has a comparatively small overall extension, preferably of 4 mm.

Figure 2:
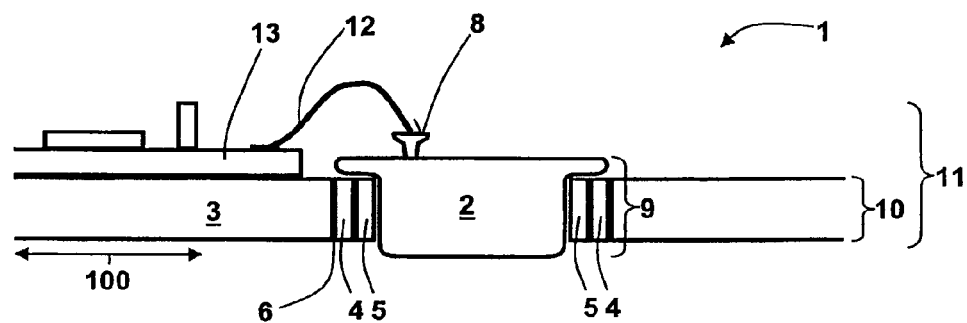
FIG. 2 shows a schematic side view of a sensor system according to a second specific embodiment of the present invention.

FIG. 2 shows a schematic side view of a sensor system 1 in accordance with a second specific embodiment of the present invention, the second specific embodiment being identical to the first specific embodiment illustrated in FIG. 1; sensor module 2 having only one terminal pin 7, which has a connection surface 8, outside of sensor module 2, that is developed essentially parallel to main plane of extension 100; and a bonding wire 12 furthermore connecting connection surface 8 electrically conductively to a component 13 situated on base plate 3. A rotation rate sensor in sensor module 2 is preferably connected to a hybrid chip on the base plate by the at least one terminal pin 7 and the at least one bonding wire 12, the hybrid chip being particularly preferably provided for carrying out a safety system such as ABS or ESP. Terminal pin 7 includes a standard pin having a head, particularly preferably, the head of the pin being situated outside of sensor module 2 and forming connection surface 8, while an additional connection surface of the standard pin contacts the sensor via an additional bonding wire on the inside of sensor module 2; the additional connection surface being especially preferably situated on the side of terminal pin 7 opposite connection surface 8 along terminal pin 7; terminal pin 7 being preferably situated using a glass passage on or in sensor module 2.

Figure 3:
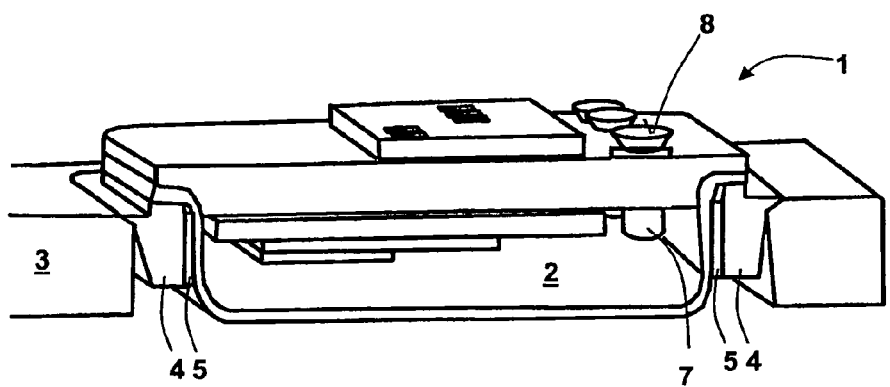
FIG. 3 shows a schematic perspective view of a sensor system according to a third specific embodiment of the present invention.
Figure 4:
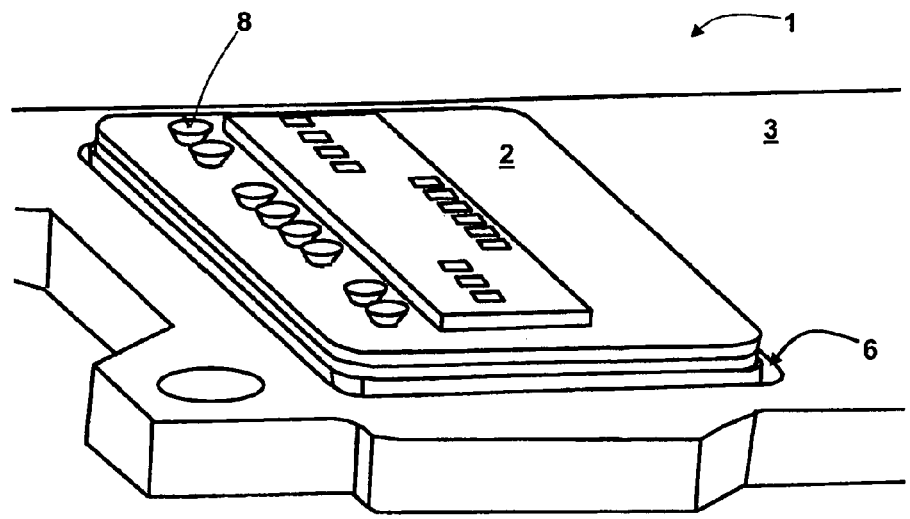
FIG. 4 shows a schematic side view of a sensor system according to a fourth specific embodiment of the present invention.
Figure 5:
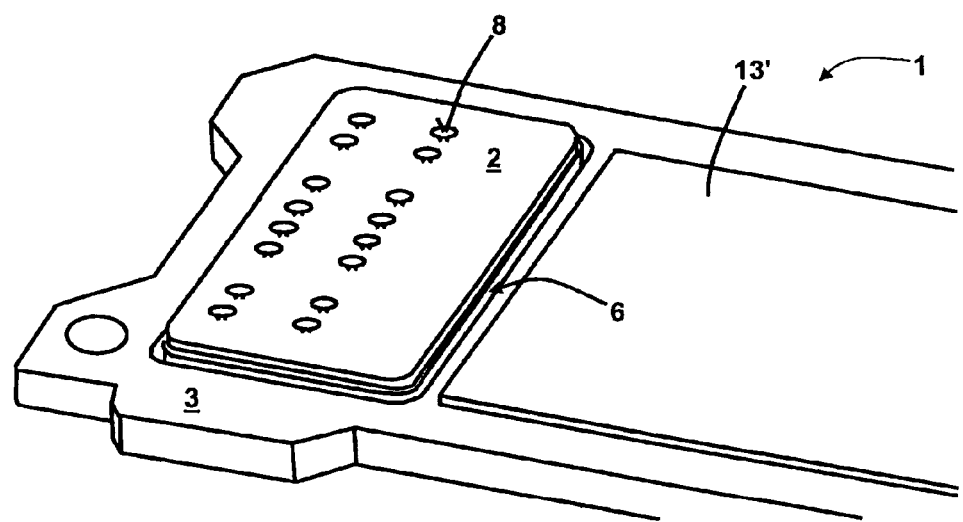
FIG. 5 shows an additional schematic side view of a sensor system according to the fourth specific embodiment of the present invention.

FIGS. 3, 4 and 5 each show schematic perspective views of a sensor system according to a third and a fourth specific embodiment of the present invention, the third and the fourth specific embodiments each being identical to the second specific embodiment illustrated in FIG. 2; the bonding wire not being shown; and moreover only different forms of the base plates and the sensor modules being shown.

What is claimed is:

1. A sensor system comprising:
   a base plate, a sensor module, a damping element and a support frame, the base plate having a main plane of extension and a recess that is perpendicular to the main plane of extension; the support frame being fastened in the recess; and the damping element being situated between the support frame and the recess,
   wherein the sensor module is pressed into the support frame in a form-locking and a force-locking manner.

2. The sensor system as recited in claim 1, wherein the sensor module has at least one terminal pin, which has a connection surface, outside the sensor module, that is essentially parallel to the main plane of extension.

3. The sensor system as recited in claim 2, wherein the terminal pin includes a standard pin, the standard pin having a head situated outside the sensor module.

4. The sensor system as recited in claim 2, wherein the connection surface is contacted electrically conductively using a bonding wire.

5. The sensor system as recited in claim 4, wherein the terminal pin has an additional connection surface which is contacted electrically conductively using an additional bonding wire.

6. The sensor system as recited in claim 5, wherein the additional connection surface is situated within the sensor module.

7. The sensor system as recited in claim 1, wherein the damping element includes a silicone.

8. The sensor system as recited in claim 7, wherein the silicone is sprayed between the support frame and the base plate.

9. The sensor system as recited in claim 1, wherein elastic properties of the damping element are essentially constant from 125 degrees Celsius to minus 30 degrees Celsius.

10. The sensor system as recited in claim 9, wherein the elastic properties of the damping element are essentially constant from 125 degrees Celsius to minus 50 degrees Celsius.

11. The sensor system as recited in claim 9, wherein the elastic properties of the damping element are essentially constant from 125 degrees Celsius to minus 40 degrees Celsius.

12. The sensor system as recited in claim 1, wherein at least one of an extension of the base plate perpendicular to the main plane of extension and an extension of the support frame perpendicular to the main plane of extension overlaps the extension of the sensor module in a direction parallel to the main plane of extension at least to an extent of 40%.

13. The sensor system as recited in claim 1, wherein at least one of an extension of the base plate perpendicular to the main plane of extension and an extension of the support frame perpendicular to the main plane of extension overlaps the extension of the sensor module in a direction parallel to the main plane of extension at least to an extent of 70%.

14. The sensor system as recited in claim 1, wherein at least one of an extension of the base plate perpendicular to the main plane of extension and an extension of the support frame perpendicular to the main plane of extension overlaps the extension of the sensor module in a direction parallel to the main plane of extension at least to an extent of 90%.

15. The sensor system as recited in claim 1, wherein the sensor system has an overall extension, perpendicular to the main plane of extension, of at most 10 mm.

16. The sensor system as recited in claim 1, wherein the sensor system has an overall extension, perpendicular to the main plane of extension, of at most 6 mm.

17. The sensor system as recited in claim 1, wherein the sensor system has an overall extension, perpendicular to the main plane of extension, of at most 5.5 mm.

18. The sensor system as recited in claim 1, wherein the sensor module includes a hermetically sealed welded metal housing, and the support frame includes an aluminum frame.

19. The sensor system as recited in claim 1, wherein the sensor module includes a rotation rate sensor.

20. A method for producing a sensor system as recited in claim 1, comprising: inserting the support frame into the recess; spraying the damping element between the recess and the support frame; and pressing the sensor module into the support frame.

21. A method for producing a sensor system as recited in claim 2, comprising: inserting the support frame into the recess; spraying the damping element between the recess and the support frame; pressing the sensor module into the support frame; and electrically contacting the connection surface of the at least one terminal pin using a bonding wire to a component that is situated on the base plate.

22. The method as recited in claim 21, wherein prior to inserting the support frame into the recess, an additional connection surface lying opposite the connection surface along the terminal pin is electrically contacted by an additional bonding wire.

* * * * *

UNITED STATES PATENT AND TRADEMARK OFFICE
CERTIFICATE OF CORRECTION

PATENT NO. : 8,448,512 B2
APPLICATION NO. : 12/734687
DATED : May 28, 2013
INVENTOR(S) : Jocham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 416 days.

Signed and Sealed this
Eighth Day of September, 2015

Michelle K. Lee
*Director of the United States Patent and Trademark Office*